Nov. 6, 1945.   G. B. COE   2,388,251
TUBE REDUCING MILL
Filed June 22, 1944   9 Sheets-Sheet 2

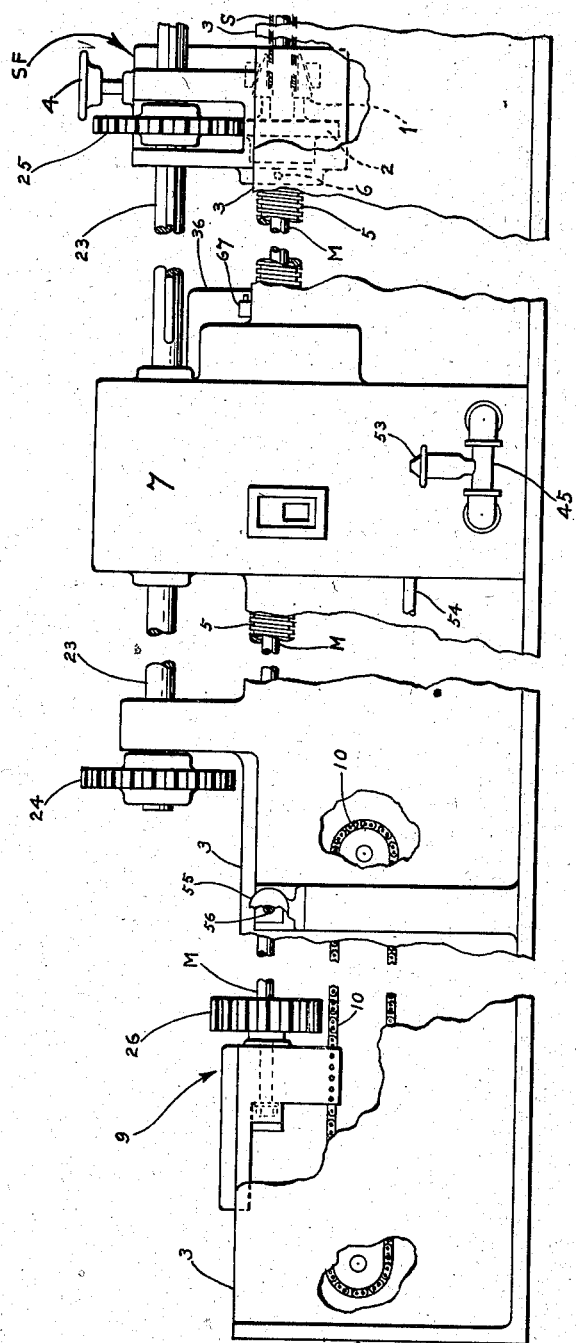

George B. Coe INVENTOR.

BY
Emery, Varney, Whittemore & Dix
Attorneys

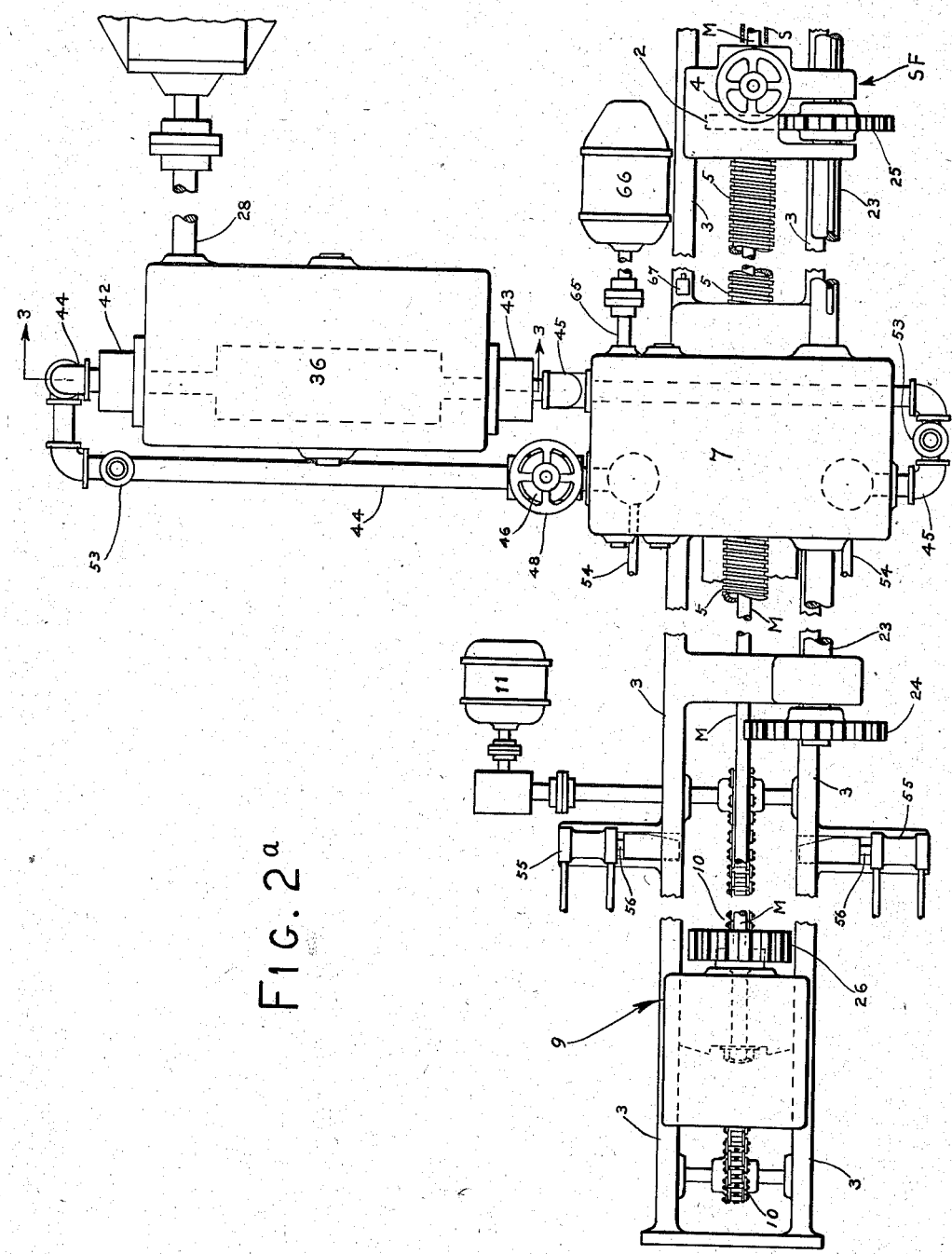

Nov. 6, 1945.   G. B. COE   2,388,251
TUBE REDUCING MILL
Filed June 22, 1944   9 Sheets-Sheet 4

George B. Coe   INVENTOR.
BY
Emery, Varney, Whittemore & Dix
Attorneys

Nov. 6, 1945.    G. B. COE    2,388,251
TUBE REDUCING MILL
Filed June 22, 1944    9 Sheets-Sheet 5

George B. Coe    INVENTOR.
BY
Emery, Varney, Whittemore & Dix
Attorneys

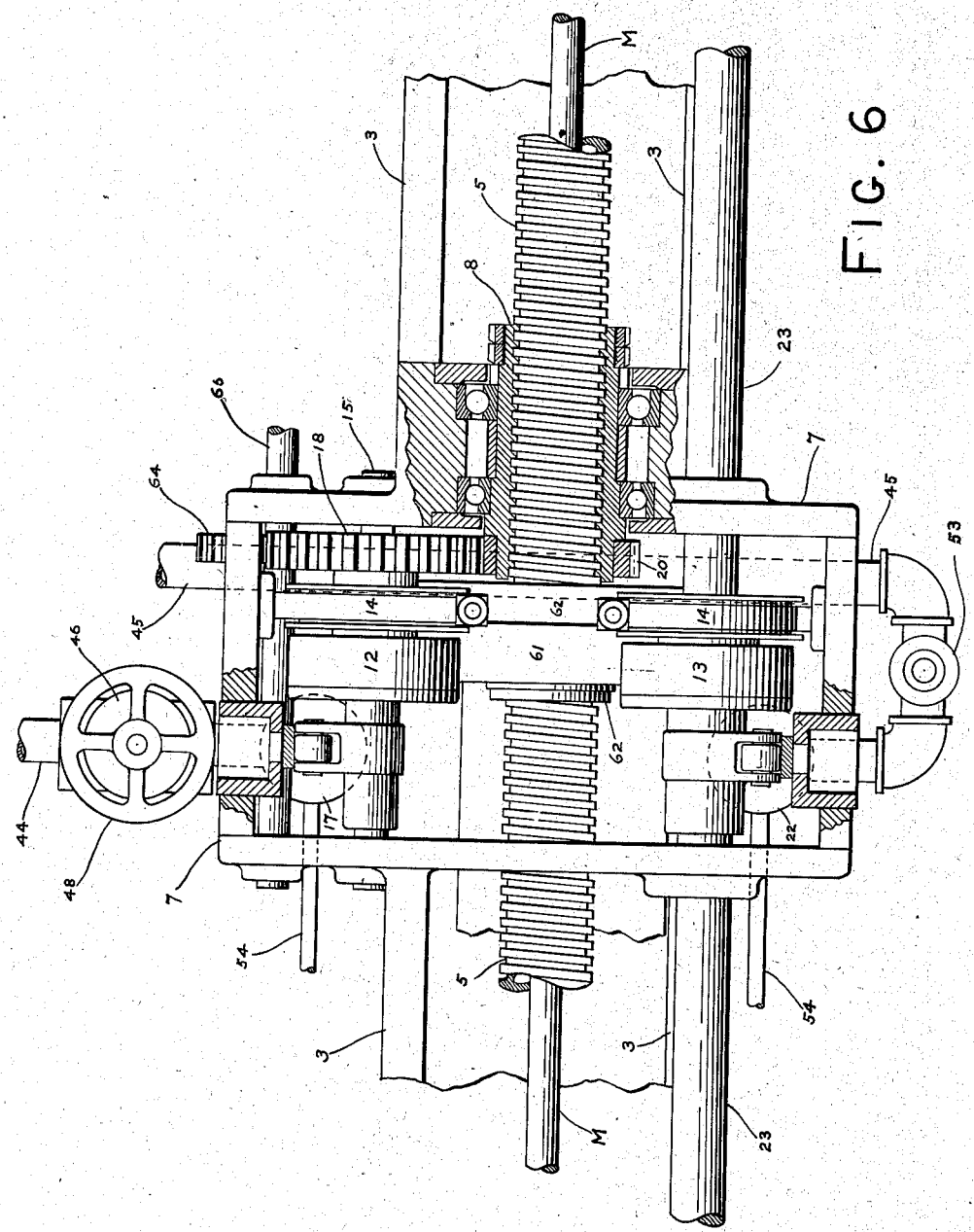

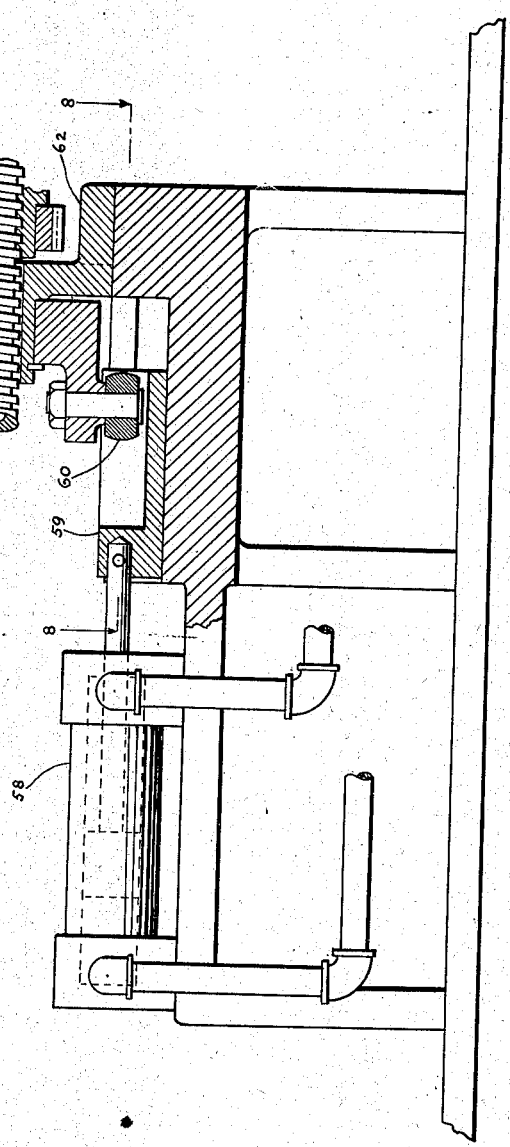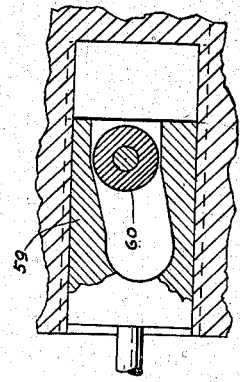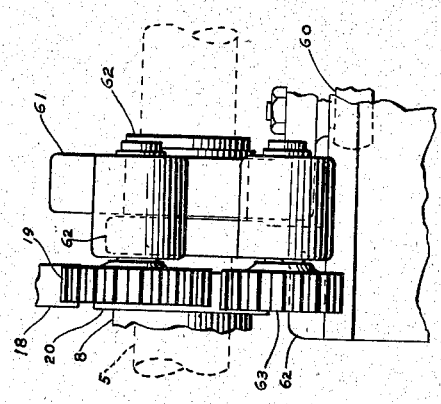

Patented Nov. 6, 1945

2,388,251

UNITED STATES PATENT OFFICE 2,388,251

TUBE REDUCING MILL

George B. Coe, Upper Montclair, N. J., assignor to Rockrite Processes, Inc., Stamford, Conn., a corporation of Delaware Application June 22, 1944, Serial No. 541,491

8 Claims. (Cl. 80—14)

This invention relates to improvements in tube reducing mills such, for example, as the type of mill shown and described in my Letters Patent No. 1,952,841 issued March 27, 1934 or any other type of tube mill wherein the tubular stock, during each cycle of the reducing rolls or rockers, is given a slight increment of feed along the mandrel and both mandrel and tube are turned (generally through an angle of from 60° to 90°) to promote uniformity of reduction and evenness of working. The improvements with which my invention is particularly concerned are in the mechanism for accomplishing this feeding and turning, the object being not only to reduce the number of parts and thus simplify the construction of such mechanism and its relation to the mill as a whole, but to prevent breakage of the parts as when an operator, for example, attempts to reduce stock the diameter of which is beyond the normal capacity of the reducing dies. By insuring against breakage, the efficiency of the mill is increased through the elimination of idle periods necessitated by repairs.

The said improvements are embodied in the mill shown in the accompanying drawings wherein, Fig. 1 (consisting of the parts 1a and 1b and covering two sheets) is a side elevation of the assembled mill, with parts of the supporting frame and base omitted for simplicity.

Fig. 2 (consisting of the parts 2a and 2b and also covering two sheets) is a top plan view thereof.

Fig. 3 is a larger scale view, partly in elevation and partly in section, of a cam box with a side broken away, the plane of the section being indicated by the line 3—3 of Fig. 2a.

Figure 3:
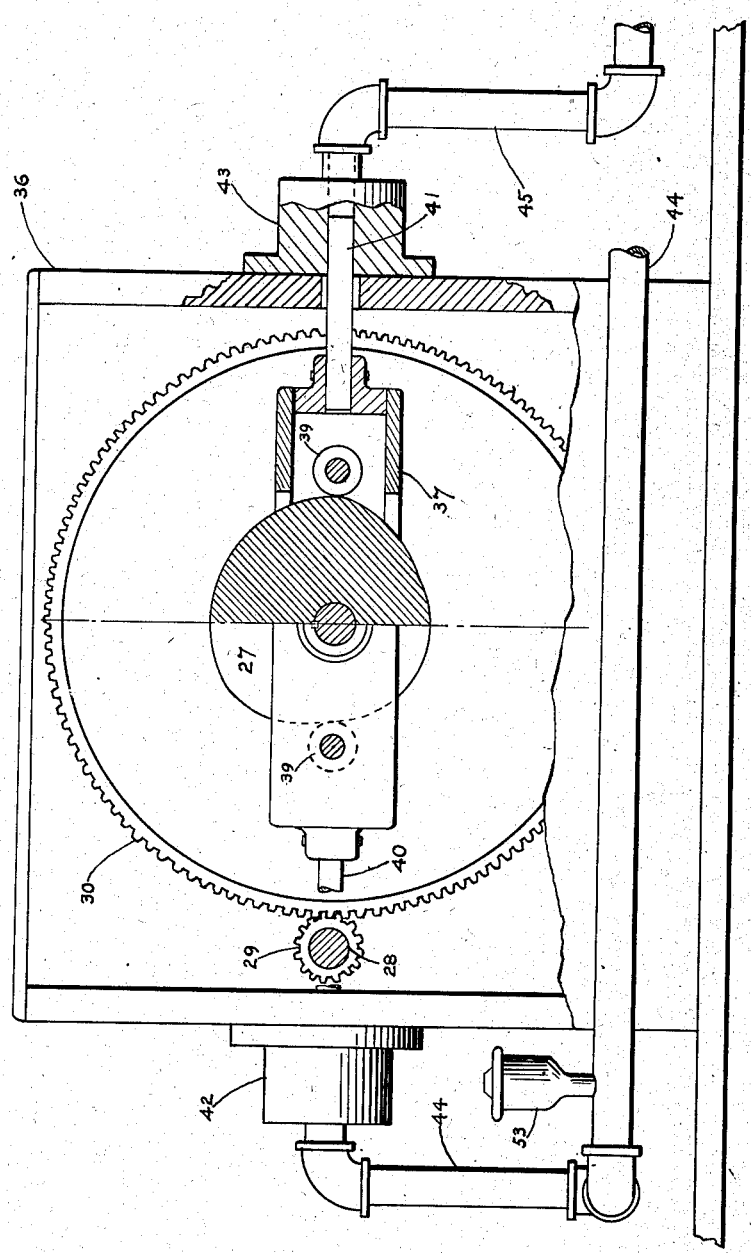
Figure 5:
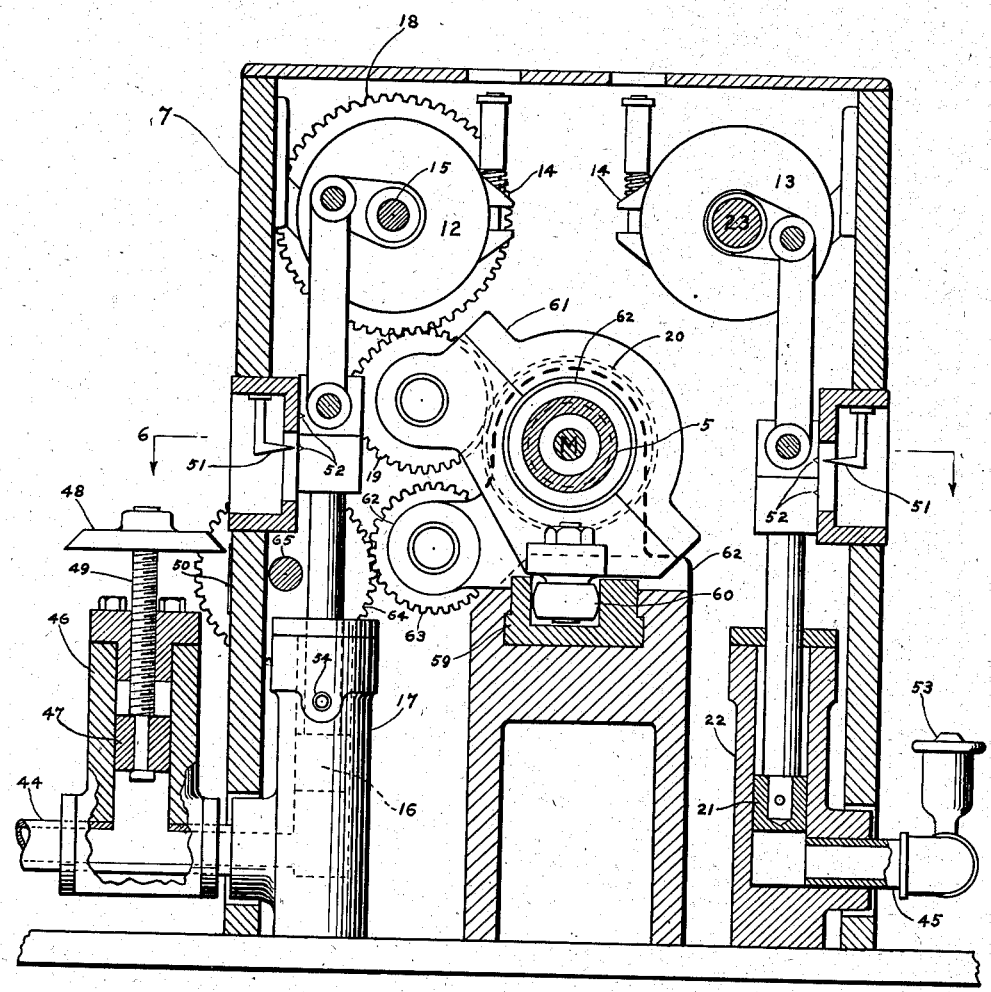
Fig. 5 is a view, partly in elevation and partly in section, of a clutch box with the side from which it is viewed removed, the scale being the same as that of Fig. 3.

Fig. 6 is a top plan view of said clutch box with its lid removed, this view being also partly in section and on the scale of Fig. 3, the plane of the section being indicated by the line 6—6 of Fig. 5; and Figs. 7, 8 and 9 are detail views of a gear shift mechanism, the views of Figs. 7 and 9 being taken from opposite sides and that of Fig. 8 being a section indicated by the line 8—8 of Fig. 7.

In its general design, the mill here shown is like that illustrated in my earlier patent above referred to where, as here, the mandrel is denoted by M, the tubular stock to be reduced by S, the main drive motor by DM, the pair of reducing rockers (in which the reducing dies are mounted) by R, and the reciprocating frame or saddle for the rockers by RF. Since reducing elements of the oscillating rocker type having a reciprocating frame or saddle are well known and since those here shown have been fully described in my said earlier patent (at line 78 p. 1 to line 60 p. 2 thereof) and since my present improvements may also be applied to a mill having continuously rotating reducing rolls of the pilger type (such as are shown and described, for example, in my Letters Patent No. 1,933,314 issued October 31, 1933), a detailed description of the reducing elements is unnecessary here for a complete understanding of my improvements.

I prefer, in any embodiment of my improvements, to keep the same relation that appears in each of my aforesaid Letters Patent, between the feeding of the stock along the mandrel and the turning of the stock and mandrel during each reducing or operating cycle; that is to say, while the stock and mandrel may, if desired, be turned at the same time as the stock is given its incremental forward feed, I prefer (and have therefore illustrated my improvements accordingly) that the reducing or operating cycle shall be as follows, assuming the beginning of each cycle to be coincident with an incremental feed of the stock: (1) incremental feed of stock (2) working stroke of dies (3) turning of stock and mandrel (4) return stroke of dies to their position for beginning the next cycle.

In accordance with my present improvements, I provide two fluid-operated one-way clutches to actuate the feeding and turning mechanisms respectively and I coordinate their respective operations in properly timed relation to each other and in synchronism with the reducing cycle, by a cam or other suitable timing mechanism. But it will be understood, of course, that if the feeding of the stock and the turning of the stock and mandrel are to occur at the same moment in the reducing cycle, only one clutch will be required.

I will now describe the embodiment of my invention shown in the drawings where said feeding and turning occur in alternation, that is, where the feeding of the stock directly precedes, and the turning of the stock and mandrel directly follows, the working stroke of the dies.

The tubular stock S to be reduced is firmly gripped and held at its rear end (Fig. 1a) in the jaws of a collet 1 attached to the hub of a gear 2 journaled in a head SF slidable upon rails 3 of the main frame of the mill; and a hand wheel 4 threaded in the head is provided in operative relation to the collet for clamping and releasing the stock respectively. When a length of stock is introduced into the mill, the head SF is in its rearward position and thereafter, during the reduction of the stock, the head is moved forward intermittently by a non-turnable threaded shaft 5 the forward end of which is rigidly secured to said head at 6 (Fig. 1a); and from this point said shaft extends backwardly through the clutch housing 7 fixed to the main frame. Rotatably mounted in said housing but restricted thereby from having any axial movement is a nut 8 (Fig. 6) engaging the threads of said shaft 5 so that as the nut rotates the shaft is driven forward and, in turn, drives the head SF forward to feed the stock to the reducing dies.

The mandrel M is turnably secured at its rear end to a base block 9 (Figs. 1a and 2a) and, during the reduction of the stock, the mandrel extends through the shaft 5 (which is made hollow for this purpose) and then through the stock itself so that the forward tapered end of the mandrel may rest in its operative position within the grooves of the reducing dies. When one length of stock has been reduced, the mandrel is drawn backwardly from the dies to its rearward position to permit the introduction of a new length, for which purpose the block 9 is slidable on the rails 3 and may be drawn back and likewise returned to operative position by a sprocket chain 10 connected thereto and operated in either direction by an auxiliary motor 11.

The one-way clutches to which I have referred are indicated at 12 and 13 in Fig. 5 and may be of the well known Horton type. Both are provided with pressure-adjustable brake bands 14 to prevent backward movement of their driven members and to check their forward movement instantaneously when actuation by their driving members ceases. The driving member of clutch 12 is keyed to a shaft 15 which is actuated by a piston 16 in a fluid-pressure cylinder 17, and its driven member is attached to a gear 18 which turns freely on shaft 15 and meshes with a shiftable gear 19 constantly in mesh with a gear 20 attached to or integral with the nut 8 (Fig. 6). Thus, upon each actuation of the clutch 12 by the piston 16, the nut 8 is rotated slightly and causes the head SF to move forward and thereby impart an increment of feed to the stock at the beginning of each reducing cycle.

The driving member of the other clutch 13 is actuated by a piston 21 in a fluid-pressure cylinder 22, and its driven member is keyed to a shaft 23. The latter has two gears 24 and 25 (Fig. 1a) keyed thereto. A gear 26 keyed to the mandrel meshes with the gear 24 when the mandrel is in its forward or operative position, and the gear 25 is constantly in mesh with the gear 2 to which, as already stated, the stock-holding collet 1 is attached. Thus, upon each actuation of the clutch 13 by the piston 21, both the mandrel and stock are turned through a predetermined angle (say from 60° to 90°) at the end of the working stroke in each reducing cycle so that upon the return stroke of the dies the latter will tend to loosen the stock from the mandrel, smooth out any irregularities therein, and otherwise effect a uniform working of the stock.

Figure 1B:
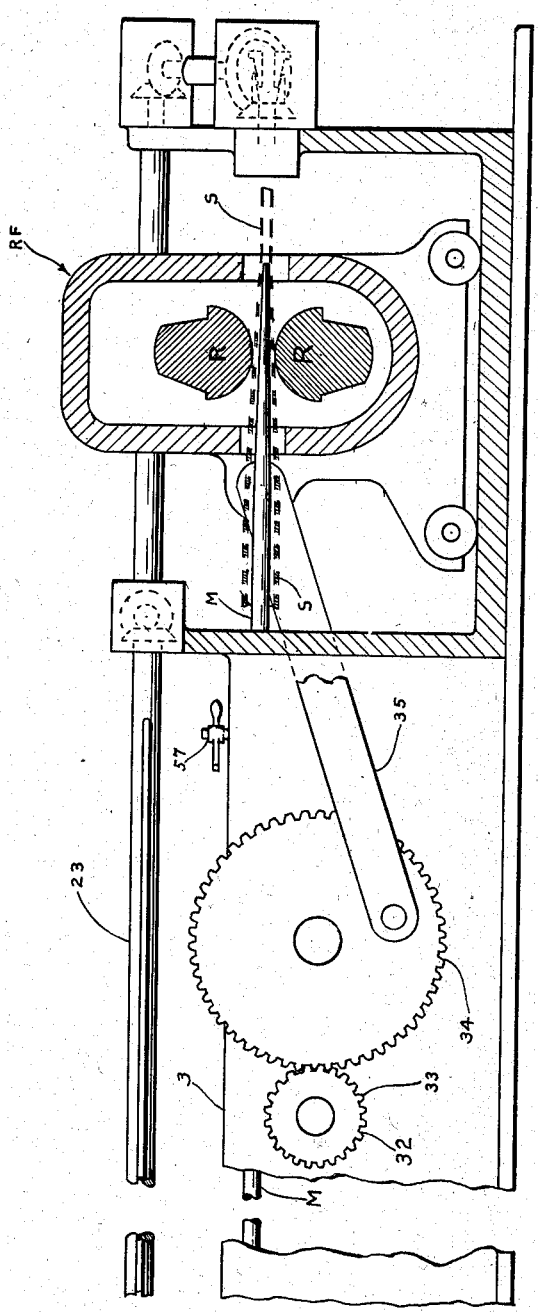
Figure 2B:
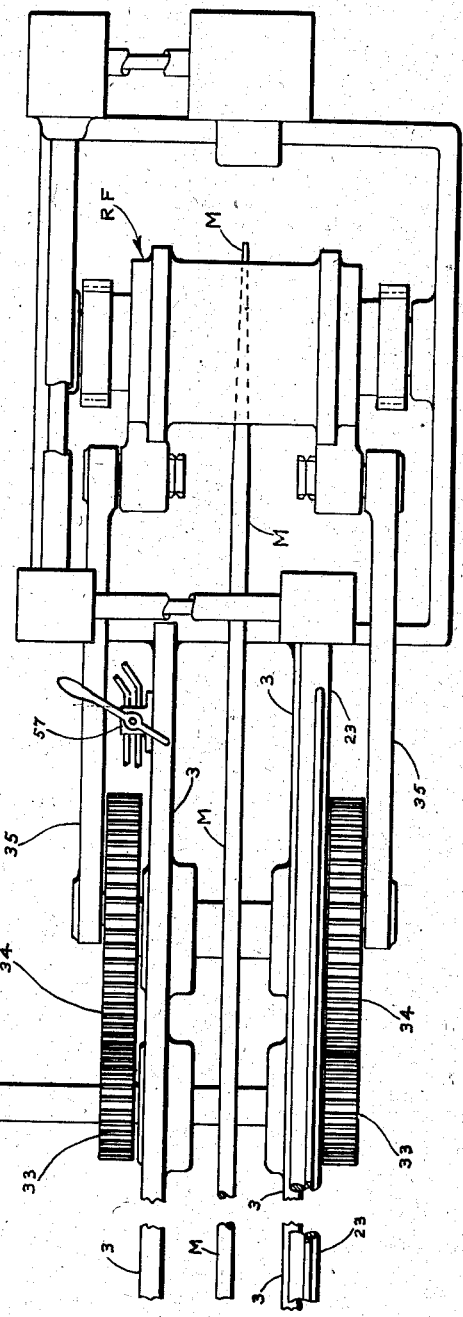
Figure 2B:
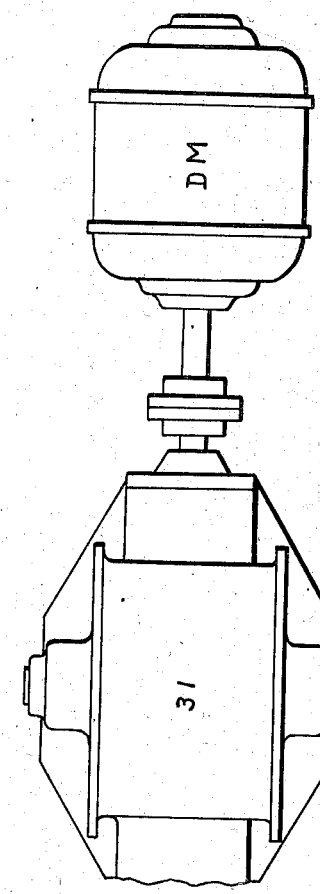
Figure 4:
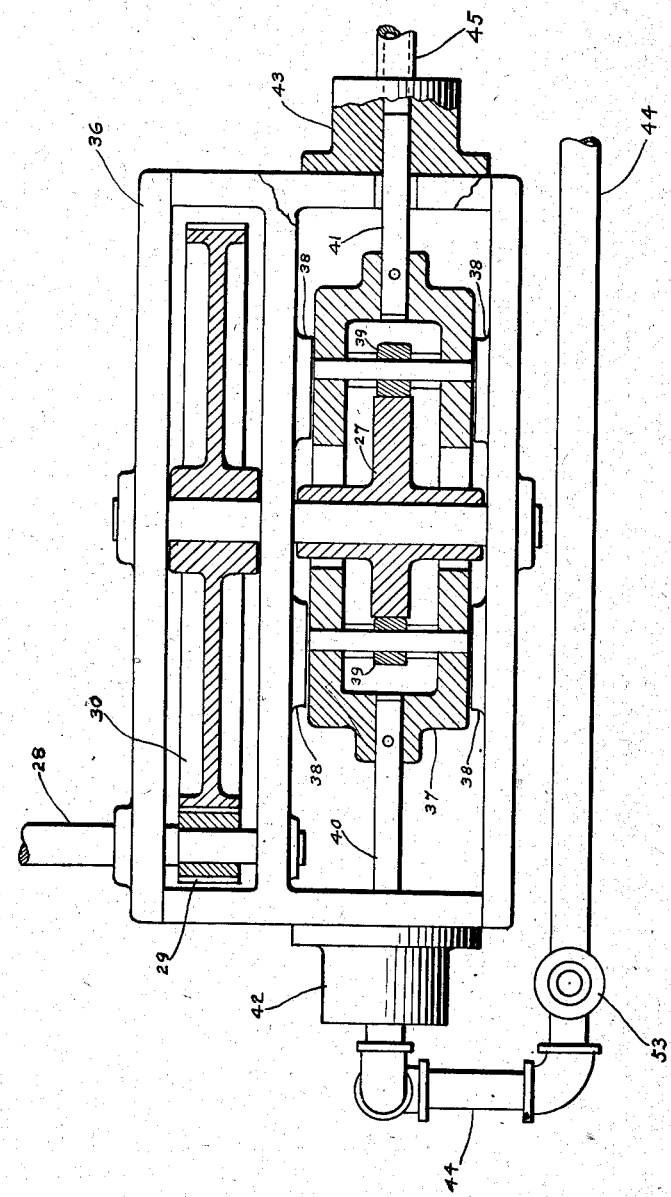
Fig. 4 is a top plan view of said cam box with its lid removed, the same being partly in section and on the scale of Fig. 3.

To cause the clutches to be actuated in properly timed relation to each other and in synchronism with the reducing rockers, I preferably interpose a cam 27 (Figs. 3 and 4) in the driving connections from the main motor DM, which connections include, besides the cam, a shaft 28, and gears 29 and 30, while the reciprocation of the frame RF (which actuates the rockers) is accomplished through driving connections with the main motor DM which include reducing gearing 31, a shaft 32, two pairs of balanced gears 33 and 34, and a pair of crank arms 35 (Figs. 1b and 2b). The gear 30 together with the cam 27 and its associated parts may be enclosed in a cam box or housing 36 fixed to the frame of the mill. The parts associated with the cam comprise, in the present case, a frame 37 reciprocable in bearings 38 and having rollers 39 which bear on opposite sides of the cam, and attached to each end of said frame 37 respectively are plungers 40 and 41 of fluid-pressure cylinders 42 and 43 formed integrally with the cam box. The fluid-pressure cylinders 42 and 43 of the cam box communicate, through lines 44 and 45, with the fluid-pressure cylinders 17 and 22 respectively housed in the casing or clutch box 7.

The aforesaid gearing connections from the main motor DM which drive the rocker frame RF, and the gearing connections from said motor which drive the cam 27 are so related that one complete revolution of the cam takes place synchronously with one complete reciprocation of the rocker frame which determines the reducing cycle. And assuming, as before, that this cycle begins with the feeding of the stock, the cam is so disposed in relation to the main motor DM and its gearing connections with the rocker frame that it will force the plunger 40 into cylinder 42 immediately preceding the working stroke of the dies, thus causing an increment of feed of the stock to take place just prior to the working stroke, and upon the completion of the working stroke and just prior to the return stroke of the dies, the cam will force the plunger 41 into the cylinder 43, thus causing a turning of the stock and mandrel at that moment. It will be observed that when one of these plungers is driven into its corresponding cylinder, the other plunger, secured as it is to the opposite end of the frame 37, will be withdrawn from its cylinder so that each plunger will be in operative position to actuate its associated clutch at the proper moment in each cycle.

To provide means for adjusting the length of the stock feed stroke, a cylindrical reservoir 46 (Fig. 5) may be formed in the pressure line 44 and provided with an adjustable piston head 47 which may be moved to and held in any desired position through a hand wheel 48 which operates a screw 49 threaded in the end of the reservoir and attached to said head. The hand wheel may have its periphery shaped so as to indicate the position of the head in the reservoir by pointing to calibrations on a plate 50 attached to the side of the housing 7. Similar means may be introduced into the other pressure line 45 for adjusting the length of the stock and mandrel turning stroke and for indicating the length for which it is adjusted. Means may also be provided to enable the operator readily to ascertain whether the pistons in the cylinders 17 and 22 are operating at full stroke or, in other words, whether there is leakage of fluid from either of the pressure lines controlling the clutches. Such means may comprise pointers 51 for registering with marks 52 on the piston rods so that whenever the pointers and marks do not accurately register, thus indicating leakage, more fluid may be introduced into the system by the operator through valves (not shown) on each of the two respective pressure lines.

Moreover, it will be seen that my improved feeding and turning mechanism permits a very simple means to be provided to prevent the breakage of any working parts which become accidentally loaded beyond their normal capacity as, for example, where tubular stock is introduced into the mill which has an outside diameter too large to be handled conveniently by the dies; for breakage in any such case may be readily insured against by introducing relief valves, as 53, in the pressure lines 44 and 45, such valves to be set to yield whenever the pressure exceeds the safety limit.

To insure the return strokes of the pistons 16 and 21, a constant but substantially lower pressure may be supplied on their opposite sides through pipes 54 which communicate with an accumulator (not shown) wherein a liquid or gas is maintained under such lower pressure. Fluid pressure from such accumulator may also be used for other purposes in connection with the operation of the mill. For example, it may be used to control the locking and unlocking of the mandrel in its forward or operative position, against the backward thrust of the dies. As shown in Fig. 2a, two cylinders 55, one on each side of the main frame of the mill, have plungers 56 adapted to be slid inwardly against the rear end of the mandrel-holding block 9 when the latter is in its forward position. These two cylinders are shown as having pressure and exhaust pipes which may be controlled by a four-way valve (not shown).

Another purpose which the accumulator may serve is to supply pressure for controlling the movements of the shiftable gear 19 which is constantly in mesh with the gear 20 attached to the feed nut 8. As has already been seen, this shiftable gear, during the reduction of the stock, is also in mesh with the gear 18 which is actuated by the feed clutch 12. When, however, the feed nut has advanced the hollow threaded shaft 5 and the head SF attached thereto to the limit of their forward positions, the head SF contacts with and turns the handle of a four-way valve 57 controlling the intake from the accumulator to each side of a piston in a pressure cylinder 58 as well as the exhaust from each side thereof (Fig. 7). This piston, in turn, controls the position of a sliding cam 59 which, through its cooperating roller 60, actuates a lever 61 carrying the aforesaid shiftable gear 19. The lever 61 swivels on a fixed bracket 62 and thereby, when the head SF has reached its forward position, shifts said gear 19 from its meshing position with the gear 18 into position to mesh with a reversing gear 63 driven by a gear 64 keyed on the shaft 65 of an auxiliary motor 66. With the shiftable gear 19 in this position, the operation of the motor 66 will rapidly and continuously rotate the feed nut 8 in a reverse direction to return the hollow threaded shaft 5 and its attached head SF to their starting positions, where the head may contact and trip an electric limit switch 67 thus stopping the auxiliary motor 66. If now the handle of valve 57 be manually returned to its original position, the slidable cam 59 will be actuated to move the shiftable gear 19 back into its normal position in mesh with the gear 18. Ordinarily, although not necessarily, the main motor switch (not shown) will be thrown to stop the motor DM before the valve 57 is operated to shift the gear 19 back to its normal position after the head SF has been returned to its starting position. When a new length of stock is to be introduced into the mill, the motor DM, if running, is stopped, the mandrel head 9 is unlocked and the auxiliary motor 11 operated to draw the mandrel to its rearward position. Then, after clamping the new length of stock in position through the hand wheel 4 and causing the mandrel to be returned to and locked in its operative position, the main motor switch is thrown to start the mill in operation.

It will be understood that after a new length of stock has been introduced into the mill, this new length will abut against the rear end of the prior length still left in the mill and impart to the prior length the same increments of feed which it itself receives directly from the stock feeding mechanism, until the prior length has been advanced through and completely reduced by the dies; and also that the shaft 23, through which the stock is turned, may be extended, as shown, to the front end of the mill beyond the dies and connected to means, as indicated in Figs. 1b and 2b of the drawings, for turning the prior length of stock as it advances through the dies.

I claim as my invention:

1. In a tube reducing mill, the combination with a mandrel, a pair of cooperating dies and actuating mechanism therefor to reduce the stock, of means for feeding the stock along the mandrel to the dies including a one-way clutch and a fluid-pressure line having at one end a piston connected to the driving member of the clutch and at the other end a plunger, means to hold the mandrel from longitudinal movement while the stock is being fed, means positively connected to both the mandrel and the stock for turning the mandrel and stock including a one-way clutch and a fluid-pressure line having at one end a piston connected to the driving member of the second named clutch and at the other end a plunger, and means operatively connected with the actuating mechanism of the dies to actuate both of said plungers in a predetermined time relation to each other and to the actuation of the dies.

2. In a tube reducing mill, the combination set forth in claim 1 and further characterized by this: that the means to actuate both plungers comprises a cam geared to the actuating mechanism of the dies.

3. In a tube reducing mill, the combination set forth in claim 1 and further characterized by the following: a longitudinally movable threaded shaft operatively connected to the stock, a nut threaded upon said shaft and operatively connected to the driven member of the first named clutch, and means to restrain said nut from movement in an axial direction.

4. In a tube reducing mill, the combination set forth in claim 1 and further characterized by the following: a longitudinally movable threaded shaft operatively connected to the stock, a nut threaded upon said shaft, means to restrain said nut from movement in an axial direction, a gear attached to said nut, a gear rotated by the driven member of the first named clutch, a reversing gear, a shiftable gear normally in mesh with the second named gear and constantly in mesh with the gear attached to said nut, and means to shift the shiftable gear from its meshing position with the second named gear into meshing position with the reversing gear.

5. In a tube reducing mill, the combination with a mandrel and a pair of cooperating dies to reduce the stock on the mandrel, of means for feeding the stock along the mandrel to the dies including a one-way clutch, a fluid-pressure cylinder, a piston in the cylinder connected to the driving member of said clutch, a slidable head, operative connections from the driven member of said clutch to said head, and a rotatable collet carried by said head and to which the stock is secured, means for turning the stock and the mandrel including a one-way clutch, a fluid-pressure cylinder, a piston in the latter cylinder connected to the driving member of the second named clutch, and operative connections from the driven member of the second named clutch to both the mandrel and said rotatable collet, and means for controlling the actuation of said pistons in a predetermined time relation to each other.

6. In a tube reducing mill, the combination set forth in claim 5 and further characterized by the following: that the operative connections from the driven member of the first named clutch to said slidable head include a longitudinally movable threaded shaft to which said head is secured, a nut threaded upon said shaft and operatively connected to the driven member of said first named clutch, and means to restrain said nut from movement in an axial direction.

7. In a tube reducing mill, the combination set forth in claim 5 and further characterized by the following: that the operative connections from the driven member of the first named clutch to said slidable head include a longitudinally movable hollow threaded shaft connected at its forward end to said slidable head, a nut threaded upon said shaft and operatively connected to the driven member of said first named clutch, and means to restrain said nut from movement in an axial direction, the mandrel extending through said hollow shaft and said head to the dies, and that means are provided to withdraw the mandrel rearwardly to permit the introduction of new stock.

8. In a tube reducing mill, the combination set forth in claim 5 and further characterized by the following: that the operative connections from the driven member of the second named clutch to both the mandrel and said rotatable collet include a shaft operatively connected with the driven member of said second named clutch, a gear on said shaft, a gear on the mandrel adapted to mesh with said gear, a gear keyed to and movable along said shaft, and a gear on the rotatable collet in mesh with the last named gear.

GEORGE B. COE.